US012686578B2

(12) United States Patent
Tada

(10) Patent No.: US 12,686,578 B2
(45) Date of Patent: Jul. 21, 2026

(54) STORAGE, SHEET STACKING APPARATUS, AND IMAGE FORMING APPARATUS

(71) Applicant: CANON KABUSHIKI KAISHA, Tokyo (JP)

(72) Inventor: Kazuki Tada, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 281 days.

(21) Appl. No.: 18/653,796

(22) Filed: May 2, 2024

(65) Prior Publication Data

US 2024/0375894 A1 Nov. 14, 2024

(30) Foreign Application Priority Data

May 10, 2023 (JP) ................................ 2023-078122

(51) Int. Cl.
*B65H 1/14* (2006.01)
*B41J 13/10* (2006.01)
*B65H 1/26* (2006.01)

(52) U.S. Cl.
CPC ............ *B65H 1/266* (2013.01); *B41J 13/103* (2013.01); *B65H 1/14* (2013.01); *B65H 2403/411* (2013.01); *B65H 2405/1144* (2013.01); *B65H 2405/121* (2013.01)

(58) Field of Classification Search
CPC .......... B41J 13/103; B65H 1/266; B65H 1/14; B65H 1/04; B65H 31/34; B65H 2403/411; B65H 2405/1144; B65H 2405/121
USPC ........................................ 271/145, 162, 171
See application file for complete search history.

(56) References Cited

U.S. PATENT DOCUMENTS 6,826,383 B2 * 11/2004 Yano .................... G03G 15/607 399/389
6,871,848 B2 * 3/2005 Matsushima ............ B65H 1/04 271/171
8,136,809 B2 * 3/2012 Furusawa ................ B65H 1/04 271/171
10,106,343 B2 * 10/2018 Kimura .................... B65H 1/04
10,227,191 B2 * 3/2019 Hyodo ............... G03G 15/6502

FOREIGN PATENT DOCUMENTS

JP 2004315159 A 11/2004
JP 2008087900 A 4/2008
JP 2019018955 A 2/2019
JP 2022045141 A 3/2022

* cited by examiner

*Primary Examiner* — Leslie A Nicholson, III
(74) *Attorney, Agent, or Firm* — Canon U.S.A., Inc. IP Division

(57) ABSTRACT

A storage to store a sheet to be conveyed by a conveyance unit includes a regulating member to regulate a sheet edge in the storage and a switching device to switch a regulating member state to a first state where a regulating member position is changeable and to a second state where the position is fixed. The storage is to be held by a main body of a sheet stacking apparatus and is moveable to a closed and to a pullout position. The regulating member state is switched to the first or second state by an operator operating the switching device when the storage is in the pullout position. When the storage is pushed from the pullout position into the closed position while the regulating member state is the first state, the regulating member state is switched from the first state to the second state by the main body.

11 Claims, 6 Drawing Sheets

STORAGE, SHEET STACKING APPARATUS, AND IMAGE FORMING APPARATUS

BACKGROUND OF THE DISCLOSURE

Field of the Disclosure

The present disclosure relates to a storage, a sheet stacking apparatus, and an image forming apparatus provided with a regulating member movable to regulate an edge of a sheet.

Description of the Related Art

The sheet stacking apparatus configured to supply a sheet to the image forming apparatus is provided with a side guide portion configured to regulate a position of the sheet in a width direction. The side guide portion is movable along the width direction. The operator adjusts a position of the side guide portion according to a size of the sheet. The side guide portion is provided with a lock switching member. The lock switching member can switch between a locked state (fixed state) in which the side guide portion is fixed so that the side guide portion does not move and an unlocked state (unfixed state) in which the position of the side guide portion can be changed. As shown in Japanese Patent Application Laid-Open No. 2022-045141 and Japanese Patent Application Laid-Open No. 2004-315159, in many cases, an unlock operation portion of a push-in type is provided at a top end of an upper portion of the side guide portion. When the operator pushes in the unlock operation portion, the lock switching member is operated to put the side guide portion into the unlocked state in which the side guide portion is movable. The operator can move the side guide portion to a desired position as it is.

However, for a sheet stacking apparatus that can stack a large number of sheets, a side guide portion is lengthened upward in a stacking direction of the sheets. In a case in which a method of moving the side guide portion by applying a force to an upper portion of the side guide portion is used, as in Japanese Patent Application Laid-Open No. 2022-045141 and Japanese Patent Application Laid-Open No. 2004-315159, the force is applied in a direction of tilting the side guide portion 1121 as shown in FIG. 1A. In order to avoid the tilting of the side guide portion 1121, as shown in FIG. 1B, there are a construction in which a plurality of slide shafts 1131 and 1132 are provided at the upper portion and a lower portion of the side guide portion 1121, a construction in which a thickness of the side guide portion 1121 is increased in a moving direction, and a construction in which a reinforcing plate is provided. Therefore, since the side guide portion 1121 becomes large and has a complicated structure, a load when operating the side guide portion 1121 becomes large.

As another method, as shown in FIG. 1C, rack members 1123 and 1124 extending in the moving direction and having rack teeth engraved are provided at the roots of the side guide portions 1121 and 1122, respectively. A gear 1126 engaging with the rack members 1123 and 1124 and an operation portion 1125 of a rotary type interlocked with the gear 1126 are provided, and the side guide portions 1121 and 1122 are moved by operating the operation portion 1125. With such a configuration, since the force is applied to each of the roots of the side guide portions 1121 and 1122, a force that tilts the side guide portions 1121 and 1122 cannot be applied to the side guide portions 1121 and 1122, so that the side guide portions 1121 and 1122 can be miniaturized.

However, in either method, the push-in mechanism is provided to the operation portion 1125 of the side guide portions 1121 and 1122 as a lock forgetting prevention mechanism of the side guide portions 1121 and 1122. A configuration in which an operator operates the operation portion 1125 while pushing in the push-in mechanism is often adopted. According to this configuration, when the operator releases his or her hand from the operation portion 1125, it is locked as it is, so that the lock is not forgotten. However, it is assumed that the operator applies force in plural directions simultaneously, and the operator has a large burden.

SUMMARY OF THE DISCLOSURE

According to an aspect of the present disclosure, a storage to store a sheet to be conveyed by a conveyance unit in a conveyance direction, the storage includes a regulating member that is movable and is configured to regulate an edge of the sheet stored in the storage, and a switching device configured to switch a state of the regulating member to a first state in which a position of the regulating member is changeable and to a second state in which the position of the regulating member is fixed so that a change in position of the regulating member is prohibited, wherein the storage is configured to be held by a main body of a sheet stacking apparatus so as to be movable to a closed position in which the storage is pushed in and movable to a pullout position in which the storage is pulled out, wherein the state of the regulating member is switched to the first state and to the second state by an operator operating the switching device when the storage is in the pullout position, and wherein, in a state in which the storage is pushed from the pullout position into the closed position while the state of the regulating member is the first state, the state of the regulating member is switched from the first state to the second state by the main body of the sheet stacking apparatus.

Further features of the present disclosure will become apparent from the following description of exemplary embodiments with reference to the attached drawings.

DESCRIPTION OF THE EMBODIMENTS

Hereinafter, the present disclosure will be described using embodiments. The scope of the present disclosure is not limited to the embodiments described below. Also, not all configurations described in the embodiment should be interpreted as essential features of the present disclosure.

(Inkjet Recording Apparatus)

Figure 1A:
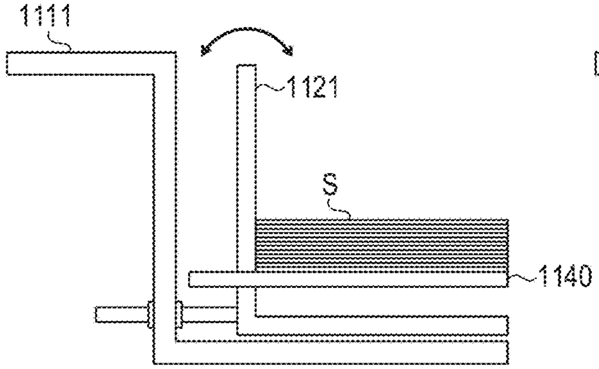
FIG. 1A is a cross-sectional view of a comparative sheet stacking apparatus.
Figure 1B:
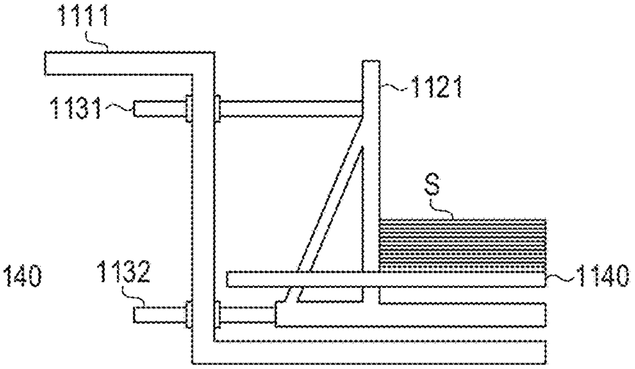
FIG. 1B is a cross-sectional view of another comparative sheet stacking apparatus.
Figure 1C:
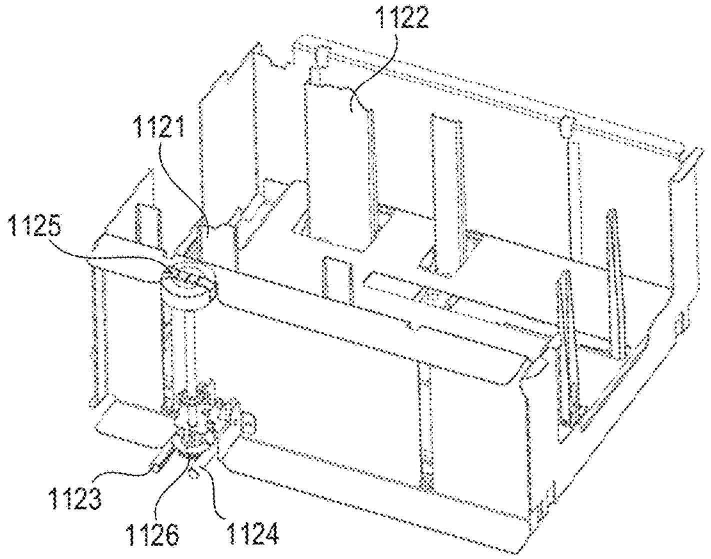
FIG. 1C is a cross-sectional view of yet another comparative sheet stacking apparatus.
Figure 2:
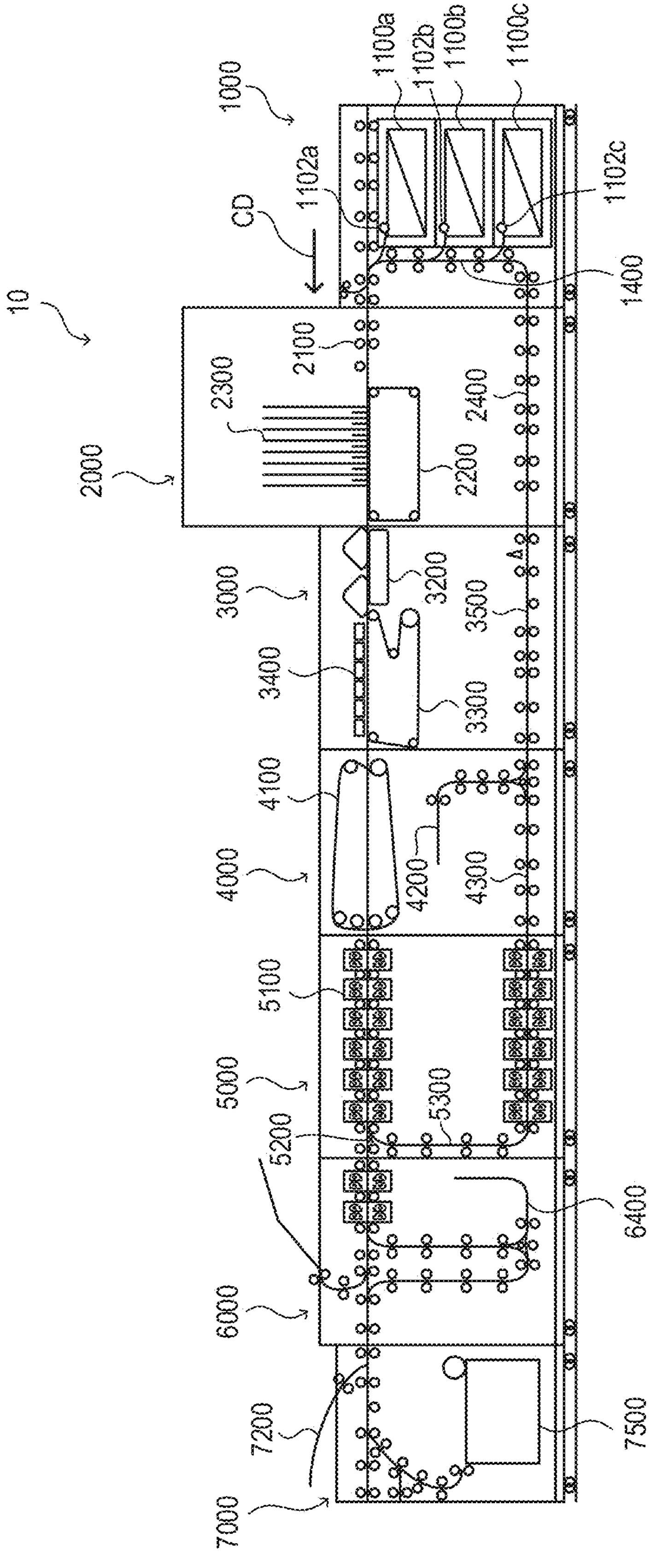
FIG. 2 is a cross-sectional view of an inkjet recording apparatus.

Hereinafter, an inkjet recording apparatus (image forming apparatus) 10 according to the embodiment will be described with reference to the accompanying drawings. FIG. 2 is a cross-sectional view of the inkjet recording apparatus 10. The inkjet recording apparatus 10 is a sheet type and forms an ink image on a sheet using two liquids: a reaction liquid and an ink. The inkjet recording apparatus 10 includes a feeding module (sheet stacking apparatus) 1000, a printing module 2000, a drying module 3000, a fixing module 4000, a cooling module 5000, a reversing module 6000, and a discharge stacking module 7000. The sheet fed from the feeding module 1000 is conveyed along a conveying path, processed by each module, and discharged to the discharge stacking module 7000.

(Feeding Module)

The feeding module 1000 includes three storages 1100*a*, 1100*b*, and 1100*c* configured to store a plurality of sheets, respectively. The storages 1100*a*, 1100*b*, and 1100*c* are configured so that they can be pulled out to the front side of the feeding module 1000. The sheets stored in each of the storages 1100*a*, 1100*b*, and 1100*c* are conveyed to the printing module (image forming portion) 2000 one by one by each of feeding portions 1102*a*, 1102*b*, and 1102*c* as a conveyance unit in a conveyance direction CD. Each of the feeding portions 1102*a*, 1102*b*, and 1102*c* includes a separation belt and a conveying roller. The sheets stacked in the storages 1100*a*, 1100*b*, and 1100*c* are fed one by one by the separation belt and the conveying roller and conveyed to the printing module 2000. The number of the storages 1100*a*, 1100*b*, and 1100*c* is not limited to 3, but may be 1, 2, or 4 or more.

(Printing Module)

The printing module 2000 includes a pre-image forming registration correction portion 2100, a print belt unit 2200, and a recording portion 2300. The sheet conveyed from the feeding module 1000 is corrected in inclination and position by the pre-image forming registration correction portion 2100 and conveyed to the print belt unit 2200. The recording portion 2300 is arranged in a position opposite to the print belt unit 2200 with respect to the conveying path. The recording portion 2300 is a sheet processing portion that forms an ink image by performing a recording process (printing) on the sheet by a recording head from above the sheet being conveyed. The sheet is sucked and conveyed by the print belt unit 2200 to ensure a clearance (print gap) between the recording head and the sheet.

A plurality of recording heads are arranged along the conveyance direction CD. In the embodiment, the recording portion 2300 has a total of five line type recording heads corresponding to the reaction liquid in addition to four colors of Y (yellow), M (magenta), C (cyan), and Bk (black). The number of colors and the number of recording heads are not limited to 5, but may be 1, 2, 3, 4 or 6 or more. Various methods such as a method using a heating element, a method using a piezo element, a method using an electrostatic element, a method using a Micro Electro Mechanical Systems (MEMS) element, etc. can be adopted for the inkjet method. Ink of each color is supplied from an ink tank (not shown) to the recording head through an ink tube. The sheet on which the ink image is formed by the recording portion 2300 is conveyed to an in-line scanner (not shown) disposed downstream of the recording portion 2300 by the print belt unit 2200. The in-line scanner (not shown) detects the deviation and color density of the ink image formed on the sheet by the recording portion 2300, and the detection result is used to correct an ink image subsequently formed.

(Drying Module)

The drying module 3000 includes a decoupling portion 3200, a drying belt unit 3300, and a hot air blowing portion 3400. The drying module 3000 is a unit which reduces the liquid content contained in the ink applied on the sheet by the recording portion 2300 and enhances the fixability between the sheet and the ink. The sheet on which the ink image is formed by the recording portion 2300 of the printing module 2000 is conveyed to the decoupling portion 3200 arranged in the drying module 3000. The decoupling portion 3200 weakly holds the sheet on the belt by applying wind pressure from above and conveys the sheet by the friction force of the belt. Thus, the sheet on which the ink image is formed on the print belt unit 2200 is prevented from shifting. While the sheet conveyed from the decoupling portion 3200 is sucked and conveyed by the drying belt unit 3300, an ink application surface of the sheet is dried by blowing hot air from the hot air blowing portion 3400 arranged above the drying belt unit 3300. In addition to the method of applying hot air, the drying method may be a method of irradiating the sheet surface with electromagnetic waves (ultraviolet rays, infrared rays, etc.), a method of conducting heat transfer by contact of a heating element, or a method combining these methods.

(Fixing Module)

The fixing module 4000 includes a fixing belt unit 4100 and a first reversing portion 4200. The fixing belt unit 4100 allows ink to be fixed to the sheet by passing the sheet conveyed from the drying module 3000 between the heated upper belt unit and the lower belt unit. A duplex conveying portion of the fixing module 4000 is provided with the first reversing portion 4200 configured to reverse the front and back sides of the sheet.

(Cooling Module)

The cooling module 5000 includes a plurality of cooling portions 5100 configured to cool a high-temperature sheet conveyed from the fixing module 4000. The cooling portions 5100 cool the sheet by taking the outside air into the cooling box by a fan, increasing the pressure in the cooling box, and applying the air jetted from the nozzle formed in the conveying guide to the sheet. The cooling portions 5100 are arranged on both sides of the conveying path, and cool the sheet from both sides.

The cooling module 5000 includes a conveying path switching portion 5200. The conveying path switching portion 5200 switches the conveying path of the sheet according to a case of conveying the sheet to the reversing module 6000 and a case of conveying the sheet to a duplex conveying path 1400 used in the duplex printing. In the duplex printing, the sheet is conveyed to a conveying path 5300 under the cooling module 5000 by the conveying path switching portion 5200. The sheet is conveyed from the conveying path 5300 to the duplex conveying path 1400 in the feeding module 1000 via a conveying path 4300 in the fixing module 4000, a conveying path 3500 in the drying module 3000, and a conveying path 2400 in the printing module 2000. The sheet is conveyed again from the duplex conveying path 1400 to the pre-image forming registration correction portion 2100, the print belt unit 2200, and the recording portion 2300 of the printing module 2000, and an ink image is formed by the recording portion 2300.

(Reversing Module)

The reversing module 6000 has a second reversing portion 6400. The second reversing portion 6400 reverses the front and back sides of the sheet being conveyed. Thus, the reversing module 6000 can change the front and back orientations of the sheet to be discharged.

(Discharge Stacking Module)

The discharge stacking module 7000 includes a top tray 7200 and a stacking portion 7500. The discharge stacking module 7000 stacks and aligns sheets conveyed from the reversing module 6000 on the top tray 7200 or the stacking portion 7500.

(Storage)

In the embodiment, the storages 1100*a*, 1100*b*, and 1100*c* provided so as to be drawable from the feeding module 1000 have the same structure, and thus the storage 1100*a* will be described below. However, the storages 1100*a*, 1100*b*, and 1100*c* need not necessarily have the same structure. For example, the storages 1100*a*, 1100*b*, and 1100*c* may be configured to have different heights so that the maximum number of sheets stacked is different.

Figure 3A:
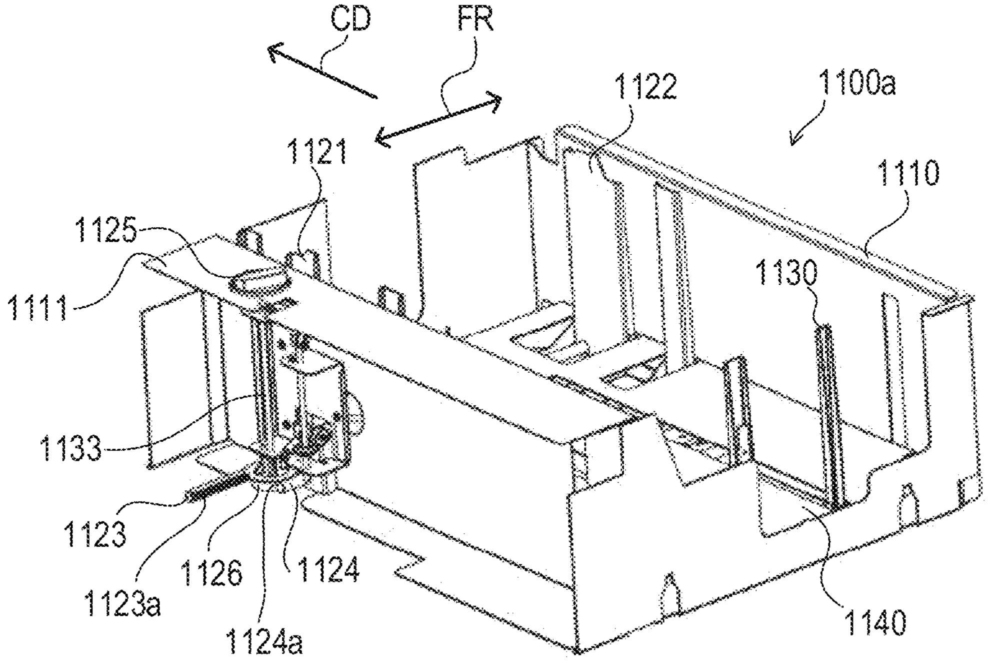
FIG. 3A is a perspective view of a storage.
Figure 3B:
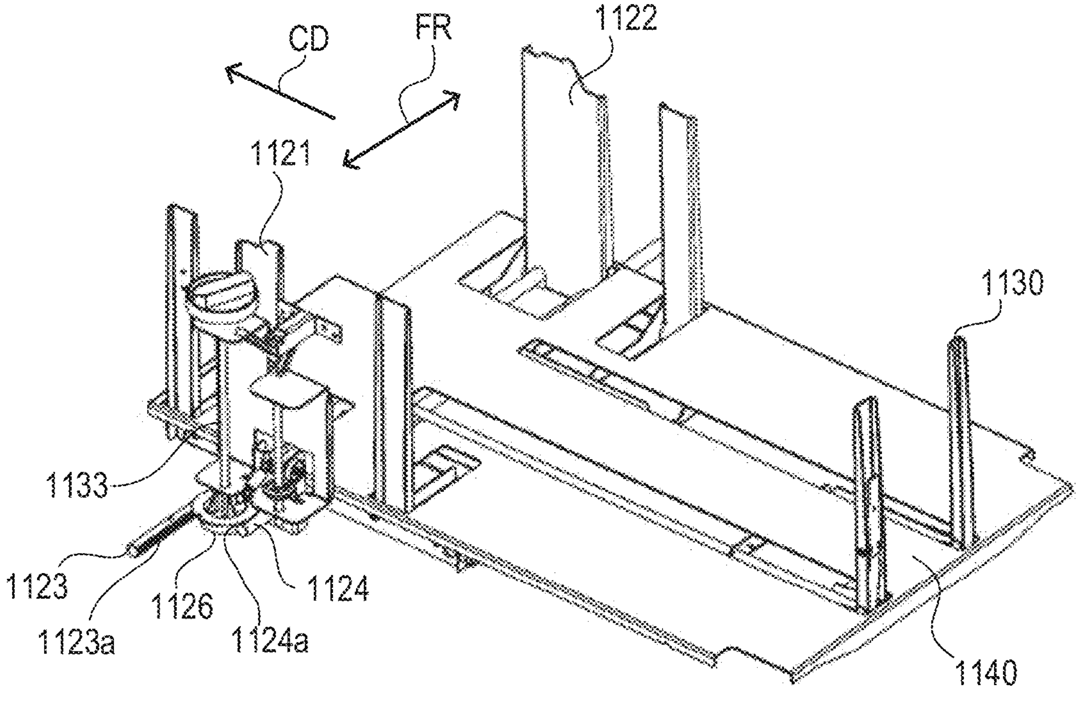
FIG. 3B is a perspective view of an interior structure of the storage with a storage frame removed.

FIG. 3A is a perspective view of the storage 1100*a*. FIG. 3A is a perspective view of a storage frame 1110 in which peripheral components such as a cover are not shown. FIG. 3B is a perspective view of an internal structure of the storage 1100*a* with the storage frame 1110 removed. The storage 1100*a* is provided with the storage frame 1110 constituting wall surfaces of the storage 1100*a*. The storage 1100*a* has, as an internal structure of the storage 1100*a*, a pair of side guide portions (regulating members) 1121 and 1122, the operation portion 1125 configured to operate the pair of side guide portions 1121 and 1122, a trailing edge guide portion 1130, and a lifter plate 1140. The pair of side guide portions 1121 and 1122 are side edge regulating members configured to regulate positions of both edges of the sheet with respect to a front-rear direction FR (width direction) orthogonal to the conveyance direction CD. The trailing edge guide portion 1130 is a trailing edge regulating member configured to regulate a position of a trailing edge of the sheet with respect to the conveyance direction CD of the sheet. The lifter plate 1140 as a stacking plate can be raised and lowered by a drive motor (not shown) as a drive portion. The lifter plate 1140 is raised by the driving force of the drive motor (not shown) to raise a bundle of sheets stacked on the lifter plate (sheet stacking surface) 1140.

Here, the configuration of the operation portion 1125 as an operation mechanism configured to operate the pair of side guide portions 1121 and 1122 that regulate the positions of the edges in the width direction of the sheets stacked in the storage 1100*a* will be described. The pair of side guide portions 1121 and 1122 are provided with rack members 1123 and 1124 that extend parallel to the front-rear direction FR. The rack member 1123 is held by the storage frame 1110 so as to be movable integrally with the side guide portion 1121 in the front-rear direction FR. The rack member 1124 is held by the storage frame 1110 so as to be movable integrally with the side guide portion 1122 in the front-rear direction FR. The rack members 1123 and 1124 have rack teeth 1123*a* and 1124*a* engraved on the side faces facing each other and extend in the front-rear direction FR. The rack teeth 1123*a* and 1124*a* are engaged with the gear 1126 disposed between the rack members 1123 and 1124. When one of the pair of side guide portions 1121 and 1122 is moved in one direction, a force is transmitted to the other of the pair of side guide portions 1121 and 1122 through the gear 1126, and the other of the pair of side guide portions 1121 and 1122 is moved in the other direction opposite to the one direction. As a result, the pair of side guide portions 1121 and 1122 are moved in the opposite directions by the same distance. The operation portion 1125 is operated by an operator and provides the driving force to the gear 1126 to change the positions of the pair of side guide portions 1121 and 1122.

The operation portion 1125, which is manually rotatable, is provided on an upper portion of the storage frame 1110 on the front side of the storage 1100*a*. The operation portion 1125 is coaxially connected to the gear 1126 by a rotary shaft 1133. When the operator operates the operation portion 1125, the gear 1126 is rotated so that the pair of side guide portions 1121 and 1122 are moved in the front-rear direction FR through the rack members 1123 and 1124. As a result, a width between the pair of side guide portions 1121 and 1122 in the front-rear direction FR can be widened or narrowed according to the width of the sheet stacked in the storage 1100*a*.

Figure 4:
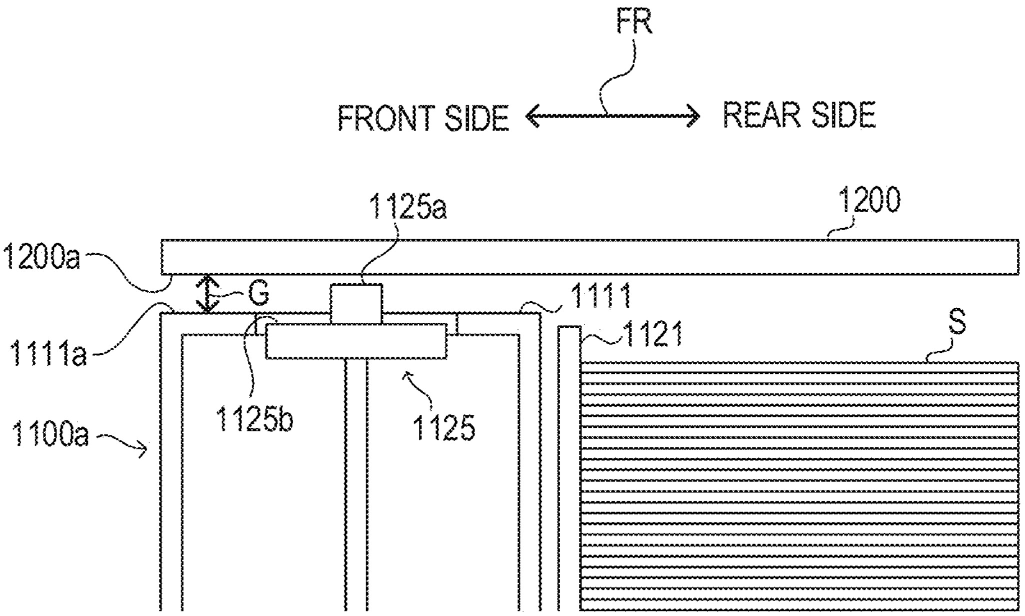
FIG. 4 is a partial cross-sectional view of a side guide portion and an operation portion in a state in which the storage is mounted in a closed position.

The storage 1100*a* is attached to a box 1200, which is a main body frame of the feeding module 1000, in a drawable manner. The storage 1100*a* is held by the box 1200 so as to be movable in the front-rear direction FR between a closed position (mounting position) in which the storage 1100*a* is pushed in toward the rear side of the box 1200 and a pullout position in which the storage 1100*a* is pulled out toward the front side of the box 1200. In a state in which the storage 1100*a* is in the pullout position, sheets can be added to the storage 1100*a* or replacing the sheet in the storage 1100*a*. FIG. 4 is a partial cross-sectional view of the side guide portion 1121 and the operation portion 1125 in a state in which the storage 1100*a* is mounted in the closed position. In order to increase the sheet stacking capacity of the storage 1100*a* as much as possible, the height of a front side plate 1111 constituting the storage frame 1110 is set so that an upper surface 1111*a* of the front side plate 1111 is as close as possible to an inner surface 1200*a* of the box 1200. The operation portion 1125 has a handle portion 1125*a* that an operator can pinch with his or her finger, and a root surface 1125*b* to which the handle portion 1125*a* is fixed. It is necessary to ensure a sufficient height of the handle portion 1125*a* of the operation portion 1125 in a small gap G between the upper surface 1111*a* of the front side plate 1111 and the inner surface 1200*a* of the box 1200. Therefore, the root surface 1125*b* of the handle portion 1125*a* is positioned lower than the upper surface 1111*a* of the front side plate 1111.

Figure 5A:
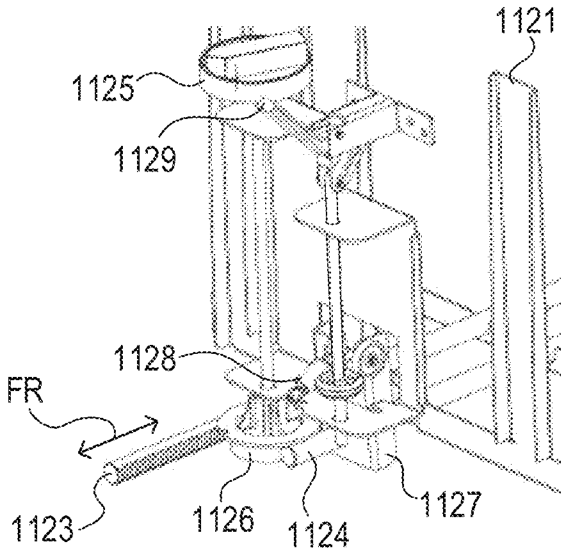
FIG. 5A, FIG. 5B, FIG. 5C, and FIG. 5D are explanatory views of an operation of switching a pair of side guide portions into a locked state and an unlocked state.
Figure 5B:
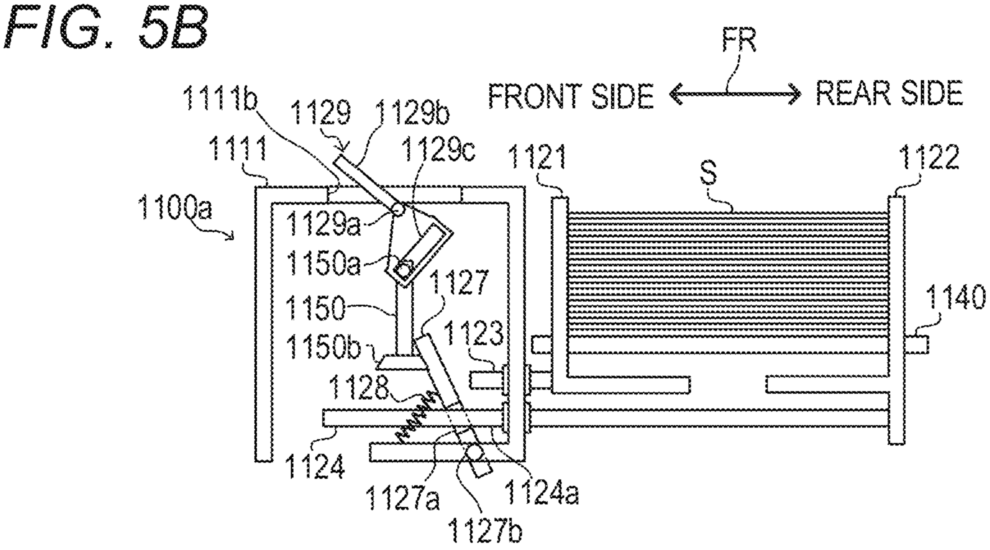
Figure 5C:
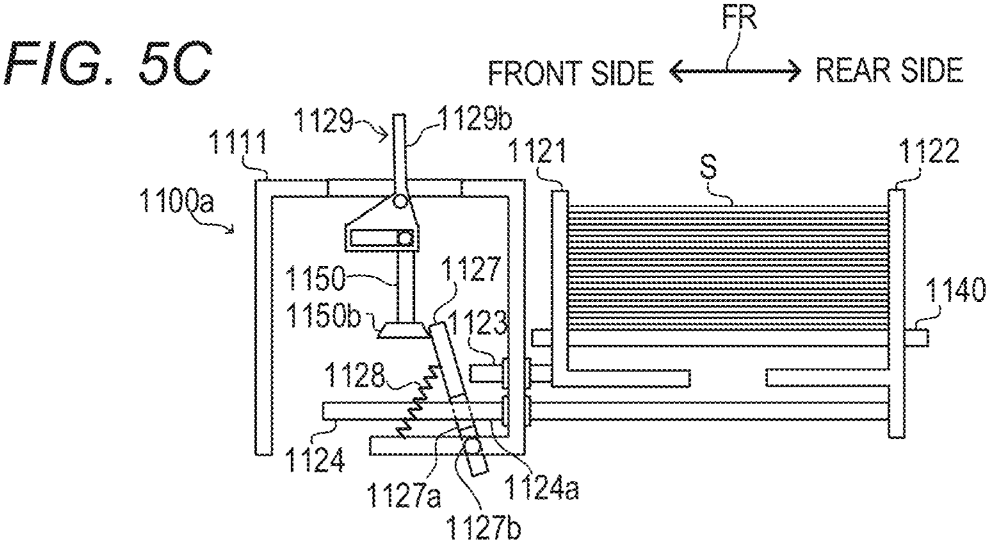

FIG. 5A, FIG. 5B, FIG. 5C, and FIG. 5D are explanatory views of an operation of switching the pair of side guide portions 1121 and 1122 into a locked state and an unlocked state. The storage 1100*a* is provided with a switching device configured to switch the state of the pair of side guide portions 1121 and 1122 into the locked state (second state) and the unlocked state (first state). The switching device includes a lock member (engaging member) 1127, an unlock member 1150, and an operation lever (lever member) 1129. In FIG. 5A, the front side plate 1111 is omitted for explanation. As described above, the rack members 1123 and 1124 respectively attached to the pair of side guide portions 1121 and 1122 are held by the storage frame 1110 so as to be movable in the front-rear direction FR. As shown in FIG. 5B and FIG. 5C, the rack members 1123 and 1124 are arranged at positions lower than the lifter plate 1140. One rack member 1124 of the pair of rack members 1123 and 1124 is provided with the lock member 1127. A shaft portion 1124*a* of the rack member 1124 is inserted into a hole portion 1127*a* formed in the lock member 1127. The lock member 1127 is supported by the front side plate 1111 rotatably around a rotary shaft 1127*b*. The lock member 1127 is urged to rotate in the counterclockwise direction in FIG. 5B by an urging member 1128 such as a tension spring.

FIG. 5B is a view showing the locked state of the pair of side guide portions 1121 and 1122. In the locked state, the lock member 1127 is urged by the urging force of the urging member 1128 to generate a friction force between the lock member 1127 and the rack member 1124 so that the hole portion 1127*a* of the lock member 1127 engages with a shaft portion 1124*a* of the rack member 1124. At this time, the lock member 1127 is positioned at a prohibited position to prohibit the movement of the rack member 1124. The movement of the pair of side guide portions 1121 and 1122 in the front-rear direction FR is restricted by the friction force between the lock member 1127 and the rack member 1124. In the locked state (second state), the positions of the pair of side guide portions 1121 and 1122 are fixed, and it is prohibited for an operator to change the positions of the pair of side guide portions 1121 and 1122 by operating the operation portion 1125. In the embodiment, in the locked state shown in FIG. 5B, even if the operator attempts to rotate the operation portion 1125, the operation portion 1125 cannot be rotated due to friction between the lock member 1127 and the rack member 1124.

The storage 1100*a* is provided with the operation lever 1129 and the unlock member 1150. The operation lever 1129 is rotatably supported around a rotary shaft 1129*a*. A hole 1129*c* is provided on a side opposite to a knob portion 1129*b* of the operation lever 1129 with respect to the rotary shaft 1129*a*. The unlock member 1150 has a projection 1150*a* fitted into the hole 1129*c* of the operation lever 1129 at one end, and a contact portion 1150*b* in contact with the lock member 1127 at the other end. The unlock member 1150 is held movably in the vertical direction. The knob portion 1129*b* of the operation lever 1129 protrudes upward through a hole 1111*b* provided in the upper portion of the front side plate 1111. In the locked state shown in FIG. 5B, the knob portion 1129*b* of the operation lever 1129 is positioned at a second position in which the operation lever 1129 is tilted forward.

FIG. 5C is a view showing the unlocked state of the pair of side guide portions 1121 and 1122. When the operator pushes up the knob portion 1129*b* of the operation lever 1129 toward the rear side to position the knob portion 1129*b* in a first position, the unlock member 1150 is pulled upward, and the contact portion 1150*b* of the unlock member 1150 is pulled upward. The contact portion 1150*b* rotates the lock member 1127 clockwise against the urging force of the urging member 1128. As a result, the friction force between the hole portion 1127*a* of the lock member 1127 and the shaft portion 1124*a* of the rack member 1124 is reduced, and the pair of side guide portions 1121 and 1122 can be moved (unlocked state). At this time, the lock member 1127 is positioned at a permissible position to permit the movement of the rack member 1124. The operation lever 1129 can switch the state of the pair of side guide portions 1121 and 1122 to the unlocked state (first state) and to the locked state (second state). In the unlocked state, the positions of the pair of side guide portions 1121 and 1122 can be changed by the operator operating the operation portion 1125.

Figure 5D:
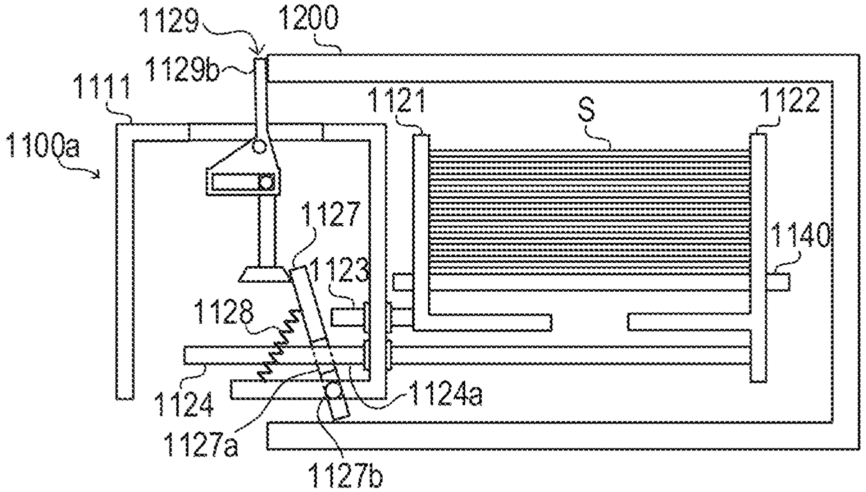

In order to switch the unlocked state to the locked state, the operator pushes down the knob portion 1129*b* of the operation lever 1129 to the front side and tilts the operation lever 1129 to the front side. However, in a case in which the operator pushes the storage 1100*a* into the box 1200 while being in the unlocked state without operating the operation lever 1129, the knob portion 1129*b* of the operation lever 1129 contacts the upper portion of the box 1200 so as to be tilted to the front side, as shown in FIG. 5D. Thus, the unlocked state returns to the locked state.

According to the embodiment, in the case in which the pair of side guide portions 1121 and 1122 are moved, the pair of side guide portions 1121 and 1122 can be moved while keeping the proper angle without requiring complicated operation of applying force in a plurality of directions simultaneously. Even if the storage 1100*a* is pushed into the box 1200 in the unlocked state, it is possible to switch from the unlocked state to the locked state in a smaller configuration with fewer parts than the comparative technology.

According to the embodiment, the operation of the pair of side guide portions 1121 and 1122 can be performed at the appropriate angle and with less force without increasing the size of the components. Even if the storage 1100*a* is pushed into the box 1200 without putting the pair of side guide portions 1121 and 1122 into the locked state, the pair of side guide portions 1121 and 1122 can be put into the locked state.

It is described that, when the storage 1100*a* that can be moved relative to the main body of the feeding module 1000 is pushed in while being in the unlocked state, the operation lever 1129 contacts the upper portion of the box (main body frame) 1200 and is tilted forward. However, the location with which the operation lever 1129 contacts may be any location of the main body of the feeding module (sheet stacking apparatus) 1000, not only the box (main body frame) 1200, and may be, for example, an exterior member attached to the box 1200.

According to the embodiment, the operation portion 1125 that provides power to the rack members 1123 and 1124 provided below the pair of side guide portions 1121 and 1122 is provided in the upper portion of the storage 1100*a*. According to the embodiment, it is possible to realize the storage 1100*a* that is smaller in scale than the comparative one, has less load during operation, and can avoid the forget to lock. According to the embodiment, even if the storage 1100*a* is pushed into the closed position while being in the first state in which the positions of the pair of side guide portions 1121 and 1122 can be changed, the storage 1100*a* can be put into the second state in which the change in positions of the pair of side guide portions 1121 and 1122 is prohibited.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-078122, filed May 10, 2023, which is hereby incorporated by reference herein in its entirety.

What is claimed is:

1. A storage to store a sheet to be conveyed by a conveyance unit in a conveyance direction, the storage comprising:

a regulating member that is movable and is configured to regulate an edge of the sheet stored in the storage; and a switching device configured to switch a state of the regulating member to a first state in which a position of the regulating member is changeable and to a second state in which the position of the regulating member is fixed so that a change in position of the regulating member is prohibited, wherein the storage is configured to be held by a main body of a sheet stacking apparatus so as to be movable to a closed position in which the storage is pushed in and movable to a pullout position in which the storage is pulled out, wherein the state of the regulating member is switched to the first state and to the second state by an operator operating the switching device when the storage is in the pullout position, and wherein, in a state in which the storage is pushed from the pullout position into the closed position while the state of the regulating member is the first state, the state of the regulating member is switched from the first state to the second state by the main body of the sheet stacking apparatus.

2. The storage according to claim 1, further comprising:

a rack member having rack teeth and that is movable integrally with the regulating member;

a gear configured to engage with the rack teeth of the rack member; and a stacking plate on which the sheet is to be stacked, wherein the rack member is arranged at a position lower than the stacking plate.

3. The storage according to claim 2, further comprising a drive portion configured to raise and lower the stacking plate.

4. The storage according to claim 1, wherein the regulating member includes a pair of regulating members that is movable in a front-rear direction orthogonal to the conveyance direction to regulate both edges of the sheet in the front-rear direction, the storage further comprising:

a pair of rack members, each having rack teeth, wherein the pair of rack members is movable integrally with the pair of regulating members, respectively; and a gear configured to engage with the rack teeth of the pair of rack members, wherein the rack teeth of each of the pair of rack members face each other and extend in the front-rear direction, and wherein, when one of the pair of regulating members is moved in one direction in the front-rear direction, the other of the pair of regulating members is moved in the other direction opposite to the one direction by the same distance.

5. The storage according to claim 4, wherein the storage is configured to be held by the main body of the sheet stacking apparatus so as to be movable in the front-rear direction to the closed position in which the storage is pushed in toward a rear side and to the pullout position in which the storage is pulled out toward a front side.

6. The storage according to claim 1, further comprising:

a rack member having rack teeth and that is movable integrally with the regulating member;

a gear configured to engage with the rack teeth of the rack member; and an operation portion which is to be operated by the operator to provide a driving force to the gear in order to change the position of the regulating member, wherein the switching device switches the state of the regulating member to the first state in which the operator is allowed to change the position of the regulating member by operating the operation portion and to the second state in which the position of the regulating member is fixed and the operator is prohibited from changing the position of the regulating member by operating the operation portion.

7. The storage according to claim 6, wherein the operation portion includes a handle portion configured to be pinched by the operator and a root surface to which the handle portion is fixed, and wherein a position of the root surface is arranged at a position lower than an upper surface of the storage.

8. The storage according to claim 1, further comprising:

a rack member having rack teeth and that is movable integrally with the regulating member; and a gear configured to engage with the rack teeth of the rack member, wherein the switching device to switch the state of the regulating member includes:

an engaging member that is movable to a permissible position to permit a movement of the rack member and is movable to a prohibited position to prohibit the movement of the rack member, and a lever member that is movable to a first position for positioning the engaging member in the permissible position and is movable to a second position for positioning the engaging member in the prohibited position.

9. The storage according to claim 8, wherein, in a case in which the storage is pushed into the closed position in a state in which the lever member is positioned in the first position, the lever member is engaged with the main body of the sheet stacking apparatus so as to be moved from the first position to the second position.

10. A sheet stacking apparatus comprising:

a storage to store a sheet to be conveyed by a conveyance unit in a conveyance direction; and a main body configured to hold the storage in a drawable manner, wherein the storage includes:

a regulating member that is movable and is configured to regulate an edge of the sheet stored in the storage, and a switching device configured to switch a state of the regulating member to a first state in which a position of the regulating member is changeable and to a second state in which the position of the regulating member is fixed so that a change in position of the regulating member is prohibited, wherein the storage is configured to be held by a main body of the sheet stacking apparatus so as to be movable to a closed position in which the storage is pushed in and movable to a pullout position in which the storage is pulled out, wherein the state of the regulating member is switched to the first state and to the second state by an operator operating the switching device when the storage is in the pullout position, and wherein, in a state in which the storage is pushed from the pullout position into the closed position while the state of the regulating member is in the first state, the state of the regulating member is switched from the first state to the second state by the main body of the sheet stacking apparatus.

11. An image forming apparatus, comprising:

a sheet stacking apparatus including a storage to store a sheet to be conveyed by a conveyance unit in a conveyance direction, and a main body configured to hold the storage in a drawable manner; and an image forming portion configured to form an image on the sheet conveyed from the sheet stacking apparatus, wherein the storage includes:

a regulating member that is movable and is configured to regulate an edge of the sheet stored in the storage, and a switching device configured to switch a state of the regulating member to a first state in which a position of the regulating member is changeable and to a second state in which the position of the regulating member is fixed so that a change in position of the regulating member is prohibited, wherein the storage is configured to be held by a main body of the sheet stacking apparatus so as to be movable to a closed position in which the storage is pushed in and movable to a pullout position in which the storage is pulled out, wherein the state of the regulating member is switched to the first state and to the second state by an operator operating the switching device when the storage is in the pullout position, and wherein, in a state in which the storage is pushed from the pullout position into the closed position while the state of the regulating member is in the first state, the state of the regulating member is switched from the first state to the second state by the main body of the sheet stacking apparatus.

* * * * *